United States Patent
Reams et al.

(10) Patent No.: US 8,344,859 B2
(45) Date of Patent: Jan. 1, 2013

(54) AUTOMATIC CHANGE OF ASSOCIATION OF A REMOTE CONTROL DEVICE WITH AN ELECTRONIC DEVICE

(75) Inventors: William Reams, Englewood, CO (US); Nathan Alexander Hale, Denver, CO (US); Jeremy Mickelsen, Denver, CO (US); David A. Innes, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 856 days.

(21) Appl. No.: 12/493,704

(22) Filed: Jun. 29, 2009

(65) Prior Publication Data

US 2010/0328132 A1    Dec. 30, 2010

(51) Int. Cl.
*G08C 19/16*    (2006.01)

(52) U.S. Cl. ............... 340/12.28; 340/12.22; 340/12.23; 340/5.71; 340/5.72; 340/10.5; 341/176; 348/734

(58) Field of Classification Search ............... 340/12.22, 340/12.23, 12.28, 5.71, 5.72, 10.5; 348/734; 341/176
See application file for complete search history.

(56) References Cited

U.S. PATENT DOCUMENTS

| | | | | |
|---|---|---|---|---|
| 5,909,183 | A * | 6/1999 | Borgstahl et al. | 340/12.29 |
| 7,586,398 | B2 * | 9/2009 | Huang et al. | 340/10.5 |
| 8,068,013 | B2 * | 11/2011 | Otsuka et al. | 340/12.22 |
| 2002/0197956 | A1 * | 12/2002 | Annola et al. | 455/41 |
| 2005/0088275 | A1 * | 4/2005 | Valoteau et al. | 340/3.1 |
| 2007/0026797 | A1 * | 2/2007 | Borjeson et al. | 455/41.2 |
| 2007/0080823 | A1 * | 4/2007 | Fu et al. | 340/825.22 |
| 2009/0045970 | A1 | 2/2009 | Miyabayashi et al. | |
| 2010/0052870 | A1 * | 3/2010 | King | 340/286.02 |

FOREIGN PATENT DOCUMENTS

| | | |
|---|---|---|
| EP | 1647958 A1 | 4/2006 |
| EP | 2182667 A2 | 5/2010 |
| WO | 2006101801 A2 | 9/2006 |

OTHER PUBLICATIONS

International Search Report and Written Opinion of the International Searching Authority issued by the European Patent Office for International application No. PCT/US2010/040216 on Sep. 30, 2010, 12 pages.

* cited by examiner

*Primary Examiner* — Albert Wong
*Assistant Examiner* — Peter Mehravar
(74) *Attorney, Agent, or Firm* — Seed IP Law Group, PLLC

(57) ABSTRACT

A method of changing an association of a remote control device from a first electronic device to a second electronic device is presented. In the method, a command for an electronic device is generated and transmitted by the remote control device. At this point, the remote control device is associated with the first electronic device to control the first electronic device, and the remote control device is not associated with the second electronic device. If an acknowledgment of the command is not received, a request to associate the remote control device with another electronic device is transmitted. A reply to the request is then received from the second electronic device. In response to the reply, the remote control device is disassociated from the first electronic device and associated with the second electronic device.

20 Claims, 7 Drawing Sheets

AUTOMATIC CHANGE OF ASSOCIATION OF A REMOTE CONTROL DEVICE WITH AN ELECTRONIC DEVICE

BACKGROUND

Remote control devices, or "remote controls", have long been a standard accessory provided with many consumer electronic devices, such as televisions, television set-top boxes, and audio receivers, to allow a user to control the electronic device from beyond arm's length. Remote control devices have long employed acoustic or infrared signals to communicate with and control the electronic device of interest, thus typically allowing the user to be located across the same room as the electronic device while retaining control of the device. Subsequently, some remote controls began employing ultra-high frequency (UHF) signals to transmit commands to electronic devices, thus significantly extending the user's virtual reach to another room or floor of a building. Such remote control devices are advantageous for controlling electronic devices which may be utilized from a number of different locations of a home, such as television set-top boxes that may be connected to more than one television.

With this extended range comes the possibility that more than one electronic device of the same type may be located within the range of the remote control device, thus possibly causing multiple electronic devices to be controlled by the same commands being transmitted by the remote control device. For example, if two tenants living in separate apartments of the same apartment building use the same type of television set-top box, either of the tenants may inadvertently alter the operation of the other tenant's set-top box, such as changing the current viewing channel, setting a recording timer, and the like.

To prevent such a scenario, the remote control and the electronic device of interest may be associated, or "paired", with each other so that only the associated electronic device may respond to commands from its paired remote control device. Typically, associating a remote control device with a particular electronic device requires a specific, and sometimes complex, combination of key or button presses involving either or both of the remote control and its related device to prevent accidental association or disassociation of the remote control device by a user. Given the potentially complicated nature of the pairing process, a professional installer is often called upon to perform such a service.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
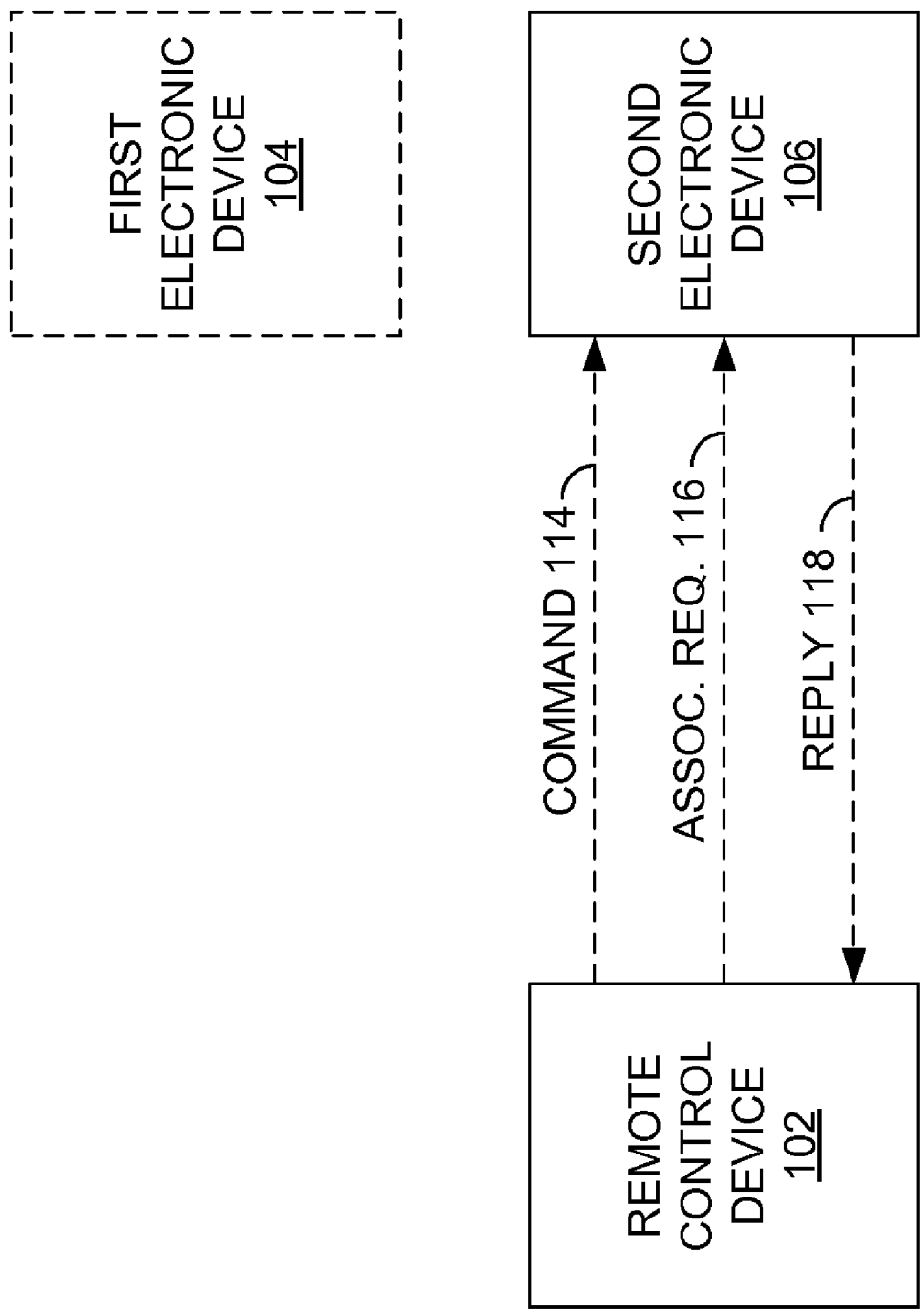
FIG. 1 is a simplified block diagram of a remote control device for controlling first and second electronic devices according to an embodiment of the invention.

FIG. 1 is a simplified block diagram of a remote control device 102 for controlling a first electronic device 104 or a second electronic device 106 according to an embodiment of the invention. The remote control device 102 may be any remote control unit, such as a handheld device capable of transmitting commands initiated by a user for controlling the first electronic device 104 or the second electronic device 106. The electronic devices 104, 106 may be any device capable of being controlled by way of the remote control device 102, such as a television set-top box, television, audio/video receiver, and the like. To allow communications only between the remote control device 102 and a desired electronic device 104, 106, the remote control device 102 may be associated or "paired" with that electronic device 104, 106, as mentioned above.

Figure 2:
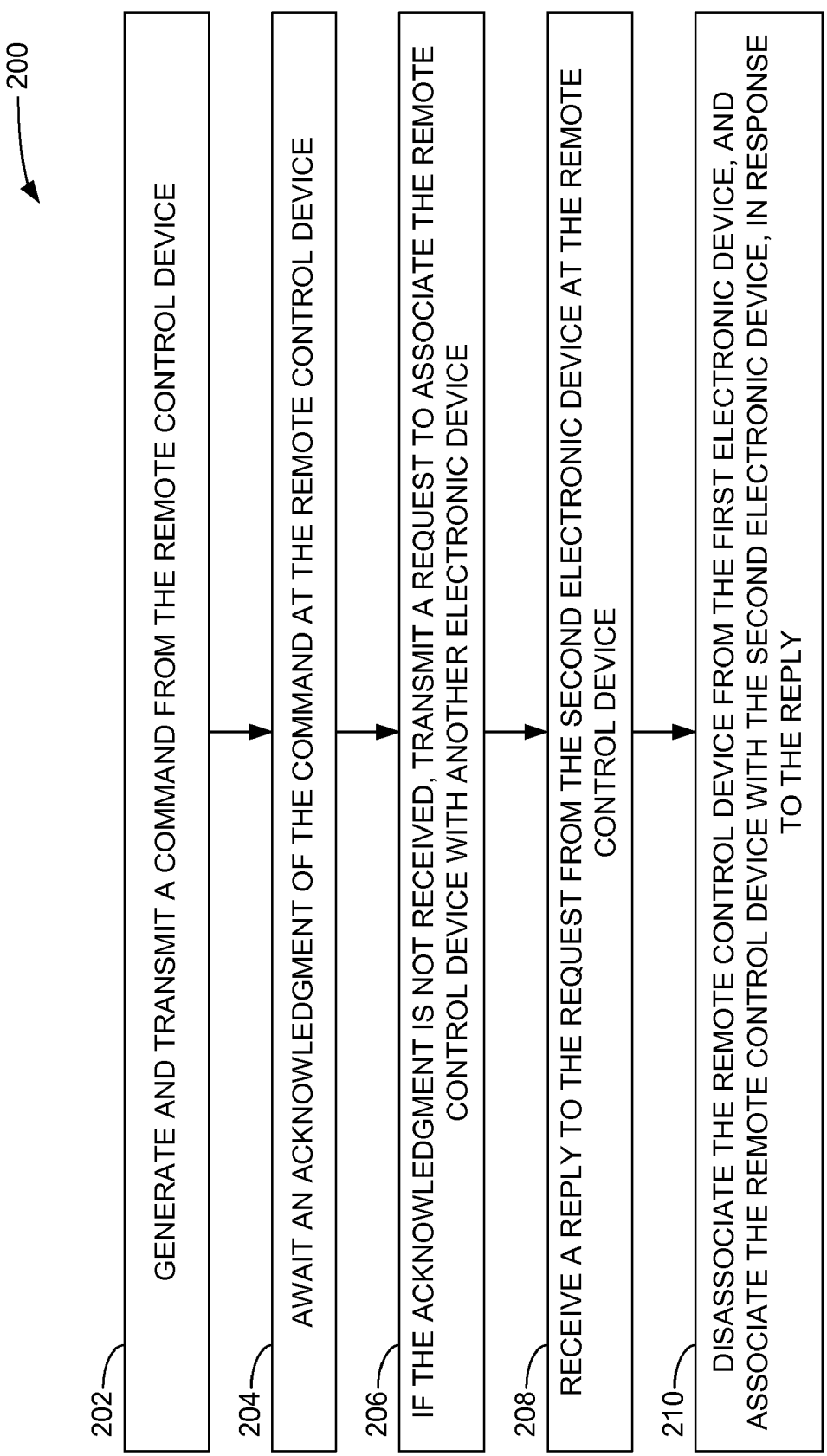
FIG. 2 is a flow diagram of a method according to an embodiment of the invention of changing an association of the remote control device of FIG. 1 from the first electronic device to the second electronic device.

FIG. 2 presents a flow diagram of a method 200 of changing an association or pairing of the remote control device 102 from the first electronic device 104 to the second electronic device 106. In other words, the remote control device 102 is paired with the first electronic device 104, thus allowing the remote control device 102 to control the first electronic device 104. At that same time, the remote control 102 is not associated with the second electronic device 106. Afterward, the remote control 102 is disassociated from the first device 104 and associated with the second device 106, thus allowing the remote control device 102 to control the second device 106. In one example, the second electronic device 106 may be employed as a replacement for the first electronic device 104, which may have failed or may be considered obsolete.

In the method 200, the remote control device 102 generates and transmits a command 114 for an electronic device (operation 202). The remote control device 102 then awaits an acknowledgment of the command 114 (operation 204). A request 116 to associate the remote control device 102 with another electronic device is also transmitted from the remote control device 102 if the expected acknowledgment is not received (operation 206). A reply 118 to the request 116 is received from the second electronic device 106 at the remote control device 102 (operation 208). In response to the reply 118, the remote control device 102 is disassociated from the first electronic device 102 and associated with the second electronic device 106 (operation 210).

While the operations of FIG. 2 are depicted as being executed in a particular order, other orders of execution, including concurrent execution of two or more operations, may be possible. In another embodiment, a computer-readable storage medium may have encoded thereon instructions for a processor or other control circuitry of remote control device 102 of FIG. 1 to implement the method 200.

As a result of at least some embodiments of the method 200, the remote control device 102 is automatically disassociated from the first electronic device 104 as a result of the first electronic device 104 failing to acknowledge or respond to the command 114 transmitted from the remote control 102, and is associated or paired with the second electronic device 106 as a result of receiving the reply 118 from the second electronic device 106. In one example in which the second electronic device 106 is utilized as a replacement for the first electronic device 104, the remote control device 102 and the second electronic device 106 operate to pair with each other without the need for the user or a professional installer to perform any specific tasks to initiate the change in association. Other advantages may be recognized from the various implementations of the invention discussed in greater detail below.

Figure 3:
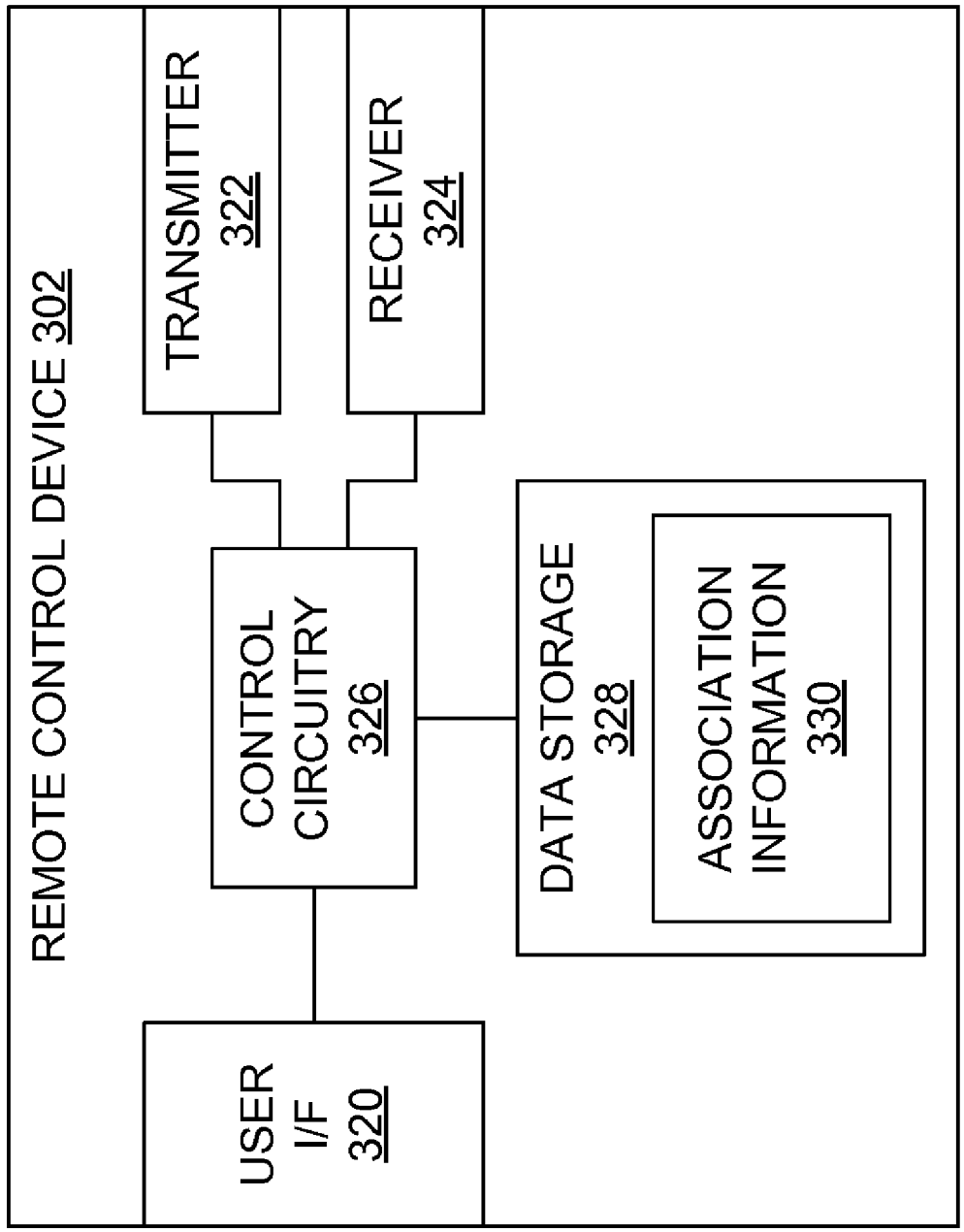
FIG. 3 is a block diagram of a remote control device according to an embodiment of the invention.

FIG. 3 is a block diagram of a remote control device 302 according to another embodiment of the invention. In one example, the remote control device 302 employs wireless signals to both transmit communications to, and receive communications from, an electronic device to be controlled or operated, such as a satellite, cable, or terrestrial ("over-the-air") television set-top box. Such devices receive audio/video programming, such as movies, sporting events, news programs, and other forms of audio/video information and entertainment, and present the programming to a user as directed by the user via the remote control device 302. Other types of electronic devices, such as digital video recorders (DVRs), televisions, audio receivers, and computers, may be controlled by way of the remote control device 302 in other implementations.

The remote control device 302 includes a user interface 320, a transmitter 322, a receiver 324, control circuitry 326, and data storage 328. In some implementations, a dual-function transceiver may be employed instead of separate transmitter 322 and receiver 324 components. Other components may also be incorporated within the remote control device 302, but such components are not discussed explicitly herein to simplify and focus the following discussion.

The user interface 320 is configured to receive user input for transmitting commands to an electronic device. In one example, the user interface 320 includes multiple keys or buttons that the user may press to initiate the commands. Such keys may include numeric keys for inputting programming channel numbers and other information, directional (e.g., "up", "down", "left", and "right") keys for menu item selection and other functions, and other special-purpose buttons. In another example, the user interface 320 may include a touchpad, a joystick, a free-space position-sensing system, such as a gyroscope or accelerometer, or similar positioning device to allow a user to move a cursor or other indicator on a display, such as by way of a television coupled with the electronic device being controlled. Various types of user input mechanisms may be employed in the user interface 320 in other examples.

The control circuitry 326 is configured to generate the desired command in response to the user input received by way of the user interface 320, as well as to control other aspects of the remote control device 302 as described in greater detail hereinafter. The control circuitry 326 may include one or more processors, such as a microprocessor, microcontroller, or digital signal processor (DSP), configured to execute instructions directing the processor to perform the functions discussed more fully below. The control circuitry 326 may also include memory or data storage adapted to contain such instructions. In another implementation, the control circuitry 326 may be strictly hardware-based logic, or may include a combination of hardware, firmware, and/or software elements.

The transmitter 322 of FIG. 3 is configured to transmit the commands generated by the control circuitry 326 to an electronic device to be controlled. In one example, the transmitter 322 is a radio frequency (RF) transmitter configured to transmit RF signals carrying the commands generated by the control circuitry 326 utilizing protocols such as Bluetooth®, Wi-Fi, ZigBee®, and the like. In other examples, the transmitter 322 may be an infrared (IR) transmitter, or may employ another wireless communication technology.

Similarly, the receiver 324 of FIG. 3 is configured to receive command acknowledgments, replies, and other communications from an electronic device by way of wireless communication signals. The control circuitry 326 may then process these communications to determine or direct subsequent operations of the remote control device 302. In one example, the receiver 324 is configured to receive communications signals of the same wireless technology as that employed by the transmitter 322, such as RF or IR communication signals.

Also included in the remote control device 302 is data storage 328 configured to store association information 330 indicating the remote control device 328 is paired or associated with a particular electronic device. In one embodiment, the data storage 328 is non-volatile data storage, such as flash memory, thus allowing a power source of the remote control device 302, such as a battery (not shown in FIG. 3) to be removed while preserving the association information 330. Other forms of data storage 328, volatile and/or non-volatile, may be utilized in other implementations. Further, the data storage 328 may be incorporated within the control circuitry 326, or be embodied as a standalone device, depending on the implementation.

Figure 4:
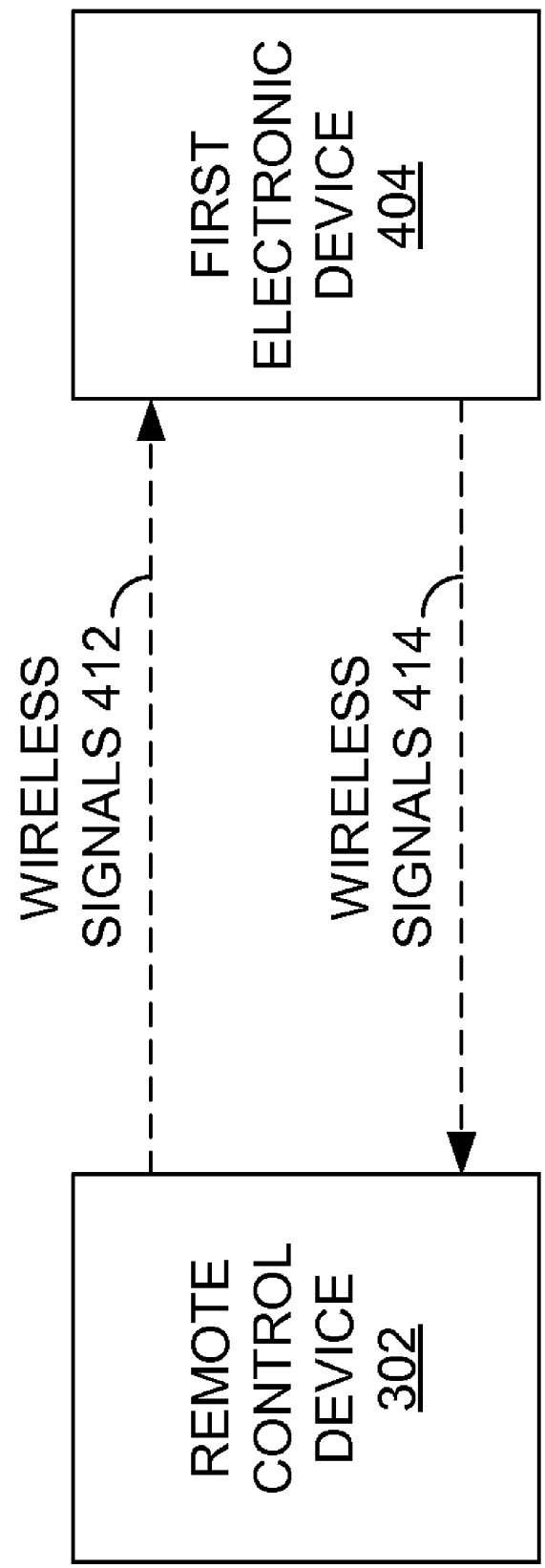
FIG. 4 is a block diagram of the remote control device of FIG. 3 in communication with a first electronic device according to an embodiment of the invention.

FIG. 4 is a block diagram of the remote control device 302 paired with a first electronic device 404, such as a satellite, cable, or terrestrial television set-top box. In one implementation, the remote control 302 and the first electronic device 404 may be associated with each other by way of a predetermined set of operations performed by a user or installer involving either or both of the remote control 302 and the first electronic device 404. For example, the first electronic device 404 may be placed in a pairing mode by way of a control panel provided on the first electronic device 404, and performing one or more predefined key press operations on the user interface 320 of the remote control device 302. Other methods by which pairing or association of the remote control device 302 with the first electronic device 404 may be employed in other embodiments.

In one implementation, during the initial pairing process, the remote control device 302 transmits a pairing request to the first electronic device 404. Accompanying the request may be a unique address of the remote control device 302, such as a media access control (MAC) address, which may be 48 or 64 bits in length. Other unique addressing schemes using different address lengths may be employed in other implementations. The pairing request, as well as subsequent commands and other communications from the remote control device 302 to the first electronic device 404, are transmitted by way of wireless signals 412 transmitted from the remote control 302 to the first electronic device 404.

Presuming the first electronic device 404 is in a proper state to receive and process the request, the first electronic device 404 may then return a response to the request indicating the pairing was successful. The response may further include other association information, which may include a second address, such as a short address and/or a network area identifier. Depending on the implementation, the short address may be any length shorter than the MAC address, such as 8, 16, or 32 bits in length. The response is transmitted by the first electronic device 404 over wireless signals 414 to the remote control 302.

The remote control device 302 may then store the received short address in the data storage 328 as the association information 330 shown in FIG. 3. The association information 330 may also include other data not described specifically herein. The remote control device 302 may then include the short address in each command transmitted to the first electronic device 404 to identify the remote control 302 as the source of the command. The first electronic device 404 may distinguish commands sourced by the remote control device 302 from those commands transmitted by other remote control devices, processing the former while ignoring the latter. Further, processing the commands from the remote control 302 may include acknowledging each command by way of a separate response transmitted to the remote control device 302.

One example of a protocol useful for implementing the above pairing process is the Institute of Electrical and Electronics Engineers (IEEE) 802.15.4 standard for low-rate wireless personal area networks (LR-WPANs) employing RF communications. In another implementation, the IEEE 802.15.1 standard covering WPANs utilizing Bluetooth® communications may be used. Other wireless communication protocols, including proprietary protocols, may be employed in other embodiments.

Figure 5:
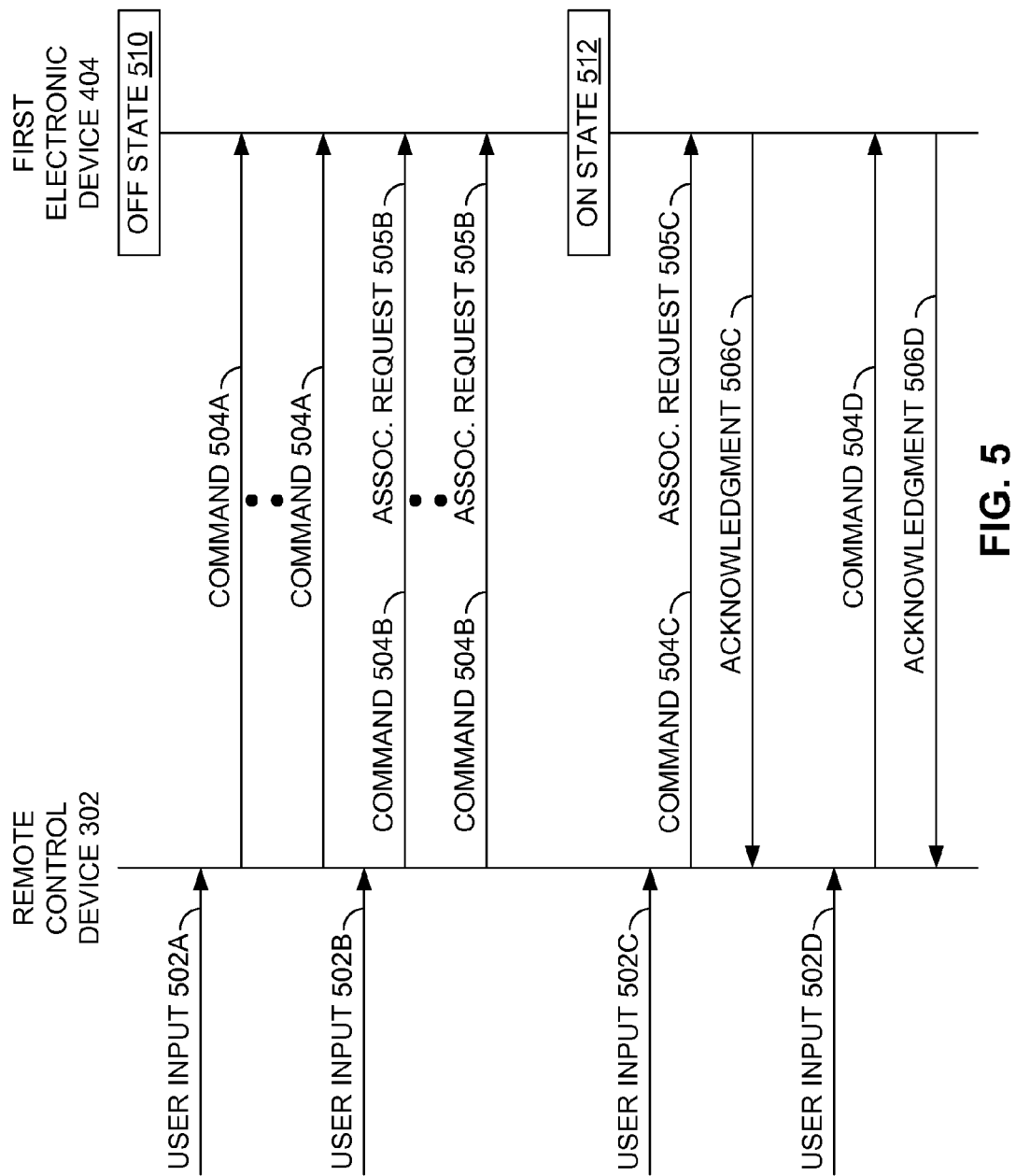
FIG. 5 is a diagram depicting communications according to an embodiment of the invention between the remote control device and the first electronic device of FIG. 4.

In the embodiments described below, the remote control device 302 is configured to request pairing with an electronic device after commands issued by the remote control 302 are not acknowledged. FIG. 5 provides a diagram depicting communications between the remote control device 302 and the first electronic device 404 currently paired with the remote control 302. More specifically, the remote control device 302 receives a user input 502A, such as a "channel up" or "volume down" key press, by way of its user interface 320. In response, the control circuitry 326 of the remote control device 302 generates a first command 504A indicated by the first user input 502A and transmits the command 504A by way of the transmitter 322 to the first electronic device 404. In one embodiment, the command 504A includes association information 330, such as the short address discussed above, identifying the remote control device 302 as the source of the first command 504A.

At the time the command 504A related to the first user input 502A is transmitted, the first electronic device 404 is in an OFF state 510. For example, electrical power may be unavailable to the first electronic device 404, or the first electronic device 404 may simply be turned off or unplugged from its power source. As a result, the first electronic device 404 does not acknowledge receipt of the command 504A, and the remote control device 302 does not receive such an acknowledgment by way of the receiver 324. In the specific example of FIG. 5, the remote control device 302 awaits for a predetermined period of time after transmitting the command 504A before retransmitting the command 504A. The control circuitry 326 may also alter one or more transmission parameters, such as the power of the wireless signal 412 carrying the command 504A, during one or more of the retransmissions of the command 504A.

After a predetermined number of transmission attempts, the remote control device 302 may cease retransmission of the command 504A. Sometime thereafter, a second user input 502B may be received from the user by way of the user interface 320. In response to the second user input 502B, the control circuitry 326 generates a command 504B for the second user input 502B along with an association or pairing request 505B, and transmits both the command 504B and the association request 505B by way of the transmitter 322. In one embodiment, the association request 505B is transmitted along with the command 504B as payload data for the command 504B. In another implementation, the command 504B and the association request 505B are transmitted as separate data transmissions, such as data packets. As the first electronic device 404 remains in the OFF state 510, the remote control device 302 does not receive an acknowledgment of the command 504B by way of the receiver 324, as such an acknowledgment is not transmitted by the first electronic device 404. Again, the control circuitry 326 of the remote control 302 may retransmit the command 504B and related association request 505B multiple times while acknowledgments are not being received at the receiver 324 of the remote control device 302.

In one implementation, the control circuitry 326 may begin generating and transmitting association requests along with retransmissions of the first command 504A, thus not waiting until a second user input 502B to begin association request 505B transmissions. According to other implementations, the control circuitry 326 may wait until after some user input following the second user input 502 to begin transmitting association requests. In one embodiment, the remote control device 302 may transmit the association request 505B after a predetermined period of time during which an acknowledgment is not received from the first electronic device 404. In another example, the remote control 302 may begin transmitting association requests 505B after a predetermined number of messages or commands have not been acknowledged by the first device 104.

After the last retransmission of the second command 504B and pairing request 505B, presume that the first electronic device 404 transitions to an ON state 512. This transition may occur merely as a result of making power available to the first electronic device 404, turning on the first electronic device 404, or the like.

With the first electronic device 404 in the ON state 512, the control circuitry 326 receives a third user input 502C by way of the user interface 320. In response to the third user input 502C, the control circuitry 326 generates a command 504C pertaining to the third user input 502C, along with another association or pairing request 505C. As the first electronic device 404 remains paired with the remote control device 302, the first electronic device 404 transmits an acknowledgment 506C of the third command 504C, having received the command 504C and recognizing by way of the included short address that the source of the command 504C is the remote control device 302. The first electronic device 404 also processes the command 504C.

Having received the acknowledgment 506C by way of the receiver 324, the control circuitry 326 of the remote control device 302 retains the pairing or association information 330 in the data storage 328, thus leaving the remote control device 302 paired with the first electronic device 404. Additionally, the remote control device 302 returns to its normal operational state in which it ceases transmission of association requests 505.

In response to a fourth user input 502D received by way of the user interface 320, the control circuitry 326 generates a fourth command 504D indicated by the fourth user input 502D and transmits the command 504D to the first electronic device 404. The command 504D includes the short address or other association information 330 maintained in the data storage 328. Further, as the previous command 504C was acknowledged by the first electronic device 404 by way of the acknowledgment 506C, the control circuitry 326 does not transmit a pairing or association request with the fourth command 504D. In response to the command 504D, the first electronic device 404, recognizing the short address of the remote control device 302 with which it is paired, acknowledges receipt of the command 504D by way of an acknowledgment 506D, and processes the command 504D. This general process of commands transmitted from the remote control 302, with each command being acknowledged by the paired first electronic device 404, continues until a command is not successfully acknowledged, at which point the remote control device 302 may again begin transmitting an association request with each command transmission, as discussed above.

In some implementations, the remote control 302 may periodically attempt to communicate with the first electronic device 404 in the absence of any user input 502A-502D. For example, the remote control device 302 may send commands 504 periodically in a polling manner, such as based on an internal hardware or software timer, to check for status or state changes in the first electronic device 404, to check for firmware updates for remote control 302, or the like. Other methods by which the commands 504 are issued without initiation by user inputs 502 may be employed in other embodiments.

Figure 6:
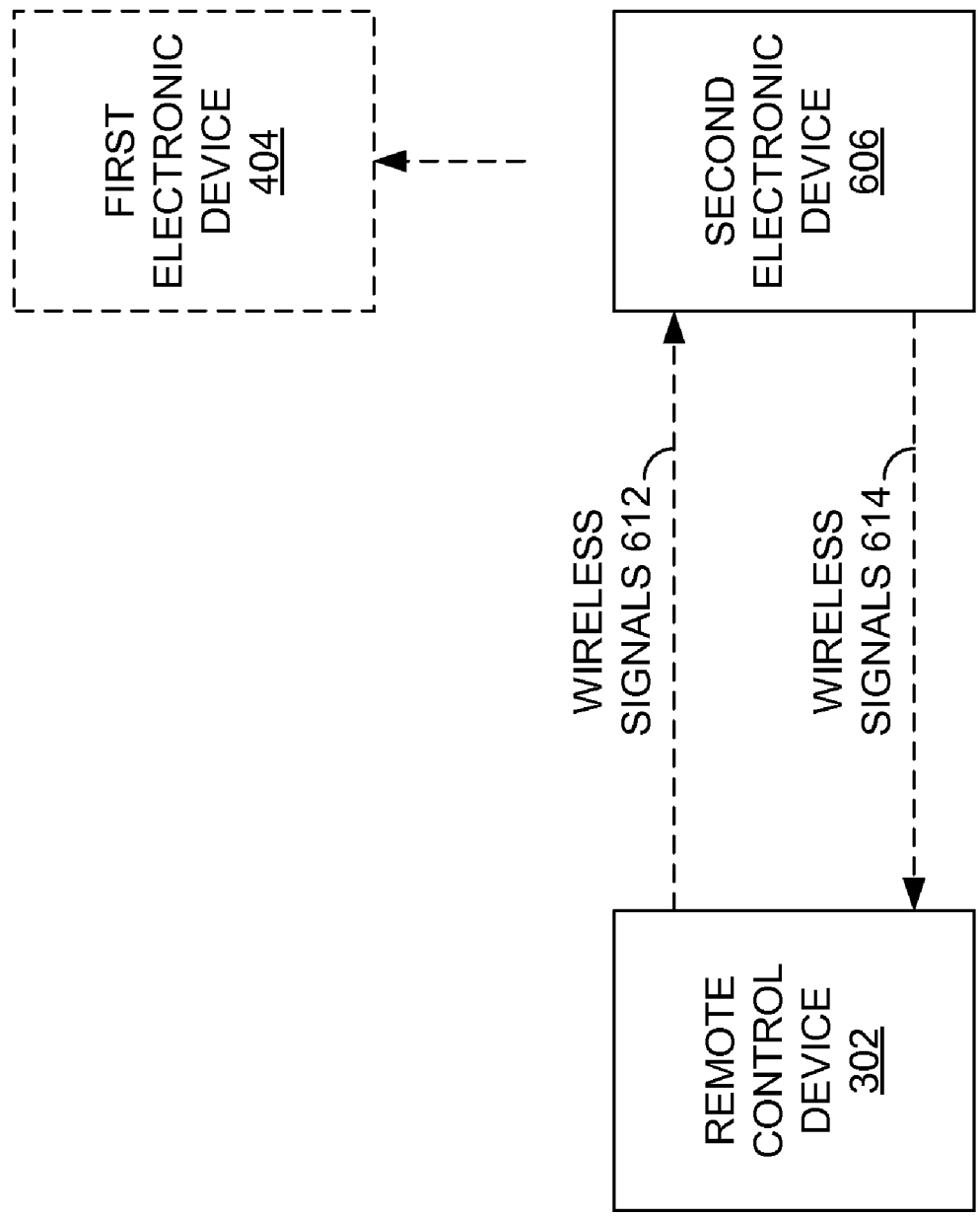
FIG. 6 is a block diagram of the remote control device of FIG. 3 in communication with a second electronic device according to an embodiment of the invention.

Instead of the first electronic device 404 being temporarily unavailable, as is depicted in the communication diagram of FIG. 5, presume instead that the first electronic device 404 is replaced by a second electronic device 606, as shown in FIG. 6. For example, the second electronic device 606 may be a newer model of the first electronic device 404, such as a newer television set-top box with more electronic program guide (EPG) functionality, a higher-capacity DVR unit, or the like. In other examples, the first electronic device 404 may become inoperative, thus requiring the use of the second device 606. However, the user may desire to use the same remote control device 302 currently paired with the first electronic device 404 to control the second electronic device 606. As shown in FIG. 5, the remote control device 302 may transmit communications to the second electronic device 606 by way of wireless signals 612, while the second electronic device 606 transmits information to the remote control 302 by way of wireless signals 614. These signals 612, 614 facilitate the disassociation of the remote control device 302 from the first electronic device 404, the association of the remote control 302 with the second electronic device 606, and the subsequent control of the second electronic device 606 by the user via the remote control device 302. In one implementation, since association information may be stored within each device 404, 606, the first device 404 may retain its association or pairing information for the remote control device 302 even though the pairing information 330 in the remote control 302 has changed.

Figure 7:
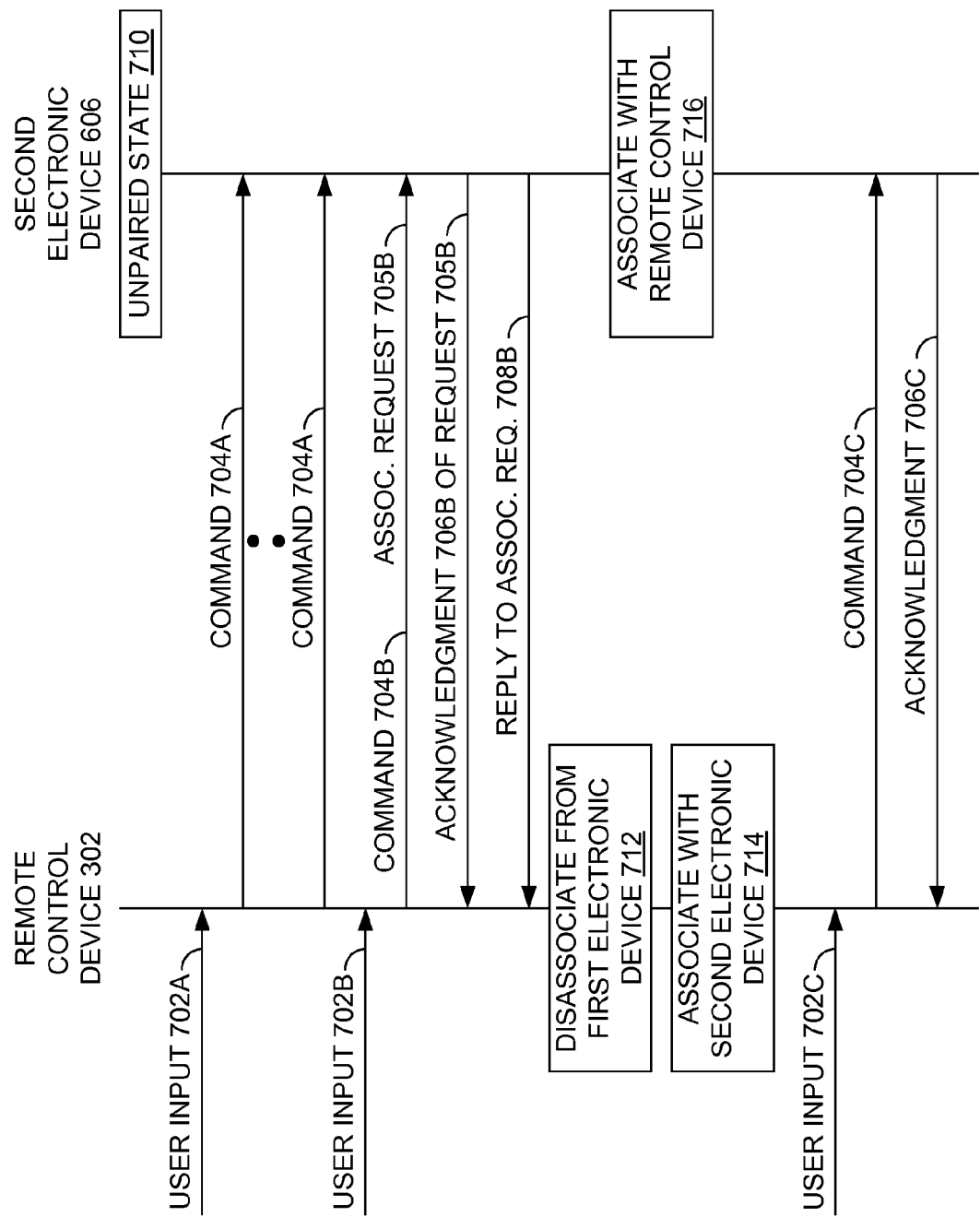
FIG. 7 is a diagram depicting communications according to an embodiment of the invention between the remote control device and the second electronic device of FIG. 6.

FIG. 7 provides a diagram illustrating communications between the remote control device 302 and the second electronic device 606 during the disassociation, association, and control processes mentioned above. Initially, the second electronic device 606 is presumed to be in an unpaired state 710. In one implementation, the unpaired state 710 exists when the second electronic device 606 is powered up and is not already associated or paired with a remote control device. Such a state may be typical when a user initially powers on the second electronic device 606. In another example, the second electronic device 606, when in the unpaired state 710, is specifically configured to receive and process pairing requests from a remote control device. In this example, the unpaired state 710 of the second device 606 is with respect to the remote control 302; the second device 606 may or may not be associated with other remote control devices not shown in FIG. 6.

While the second electronic device 606 is in the unpaired state 710, the control circuitry 326 of the remote control device 302 receives a first user input 702A by way of the user interface 320. At this point in time, the remote control device 302 is paired with the first electronic device 404 of FIG. 4, as indicated by the association information 330 stored in the data storage 328. In response to the first user input 702A, the control circuitry 326 generates a first command 704A indicated by the first user input 702A. In one implementation, the control circuitry 326 incorporates within the first command 704A the association information 330, such as the short address generated by the first electronic device 404 mentioned above. The control circuitry 326 transmits the command 704A with the association information 330 via the transmitter 322 of the remote control device 302.

The second electronic device 606 receives the transmitted command 704A. However, since the second electronic device 606 is not paired with the remote control device 302, the second electronic device 606 does not acknowledge the command 704A. As a result, the control circuitry 326 of the remote control device 302 may retransmit the first command 704A if an acknowledgment is not received as expected from the first electronic device 404 within some predetermined time period. Such retransmission may occur multiple times in some implementations before retransmission attempts are ended.

In response to a second user input 702B received via the user interface 320, the control circuitry 326 generates a second command 704B indicated by the second user input 702B. Additionally, the control circuitry 326, having not received an acknowledgment to the previous command 704A, generates an association or pairing request 705B. Both the second command 704B and the pairing request 705B are transmitted by way of the transmitter 322, and received by the second electronic device 606.

In one implementation, the pairing request 705B may be part of the second command 704B, such as payload data of the second command 704B. In another example, the second command 704B and the pairing request 705B are transmitted as separate data transmissions, which are received by the second electronic device 606.

In one embodiment, the pairing request 705B may be transmitted in conjunction with one of the retransmissions of the first command 704A instead of waiting until the second user input 702B is received at the user interface 320. In another example, the pairing request 705B may instead be transmitted with commands related to user inputs received at the user interface 320 after the second user input 702B. In yet another arrangement, the pairing request 705B may be transmitted in conjunction with automatically-generated messages or commands generated and transmitted by the remote control device 302, such as periodic polling messages, not associated with user activity. Such transmissions may thus be generated in response to an event, such as the expiration of a timer, occurring within the remote control device 302. In other words, the commands 704A-704C, as well as the association request 705B, may be generated and transmitted in response to events occurring internally to the remote control 302, instead of in response to any specific user input 702.

Since the second electronic device 606 is not paired to the remote control device 302, the second electronic device 606 does not respond to the second command 704B, as was the case with the first command 704A. However, the second electronic device 606 acknowledges receipt of the pairing request 705B by way of transmitting an acknowledgment 706B of the association request 706B to the remote control 302. Additionally, the second electronic device 606 transmits a reply 708B to the association request 705B. In one implementation, the second device 606 generates a short address for the remote control 302, possibly along with other association information, and may include the short address and other association information in the reply 708B.

Accordingly, the control circuitry 326 of the remote control device 302 receives both the acknowledgment 706B and the reply 708B by way of the receiver 324. As a result of receiving the acknowledgment 706B, the control circuitry 326 does not retransmit the second command 705B. Instead, the control circuitry 326 responds to receiving both the acknowledgment 706B and the reply 708B by disassociating 712 the remote control device 302 from the first electronic device 404, and associating 714 the remote control device 302 with the newer second electronic device 606. In one variation, the acknowledgment 706B and the reply 708B may be combined as a single response from the second electronic device 606 to the remote control device 302.

The control circuitry 326 may disassociate the remote control device 302 from the first electronic device 404 by clearing the association information 330 indicating the pairing of the remote control 302 and the first device 404 from the data storage 328. Similarly, the control circuitry 326 associates the remote control 302 with the second device 606 by storing association information 330 contained in the reply 708B, such as the short address described above, in the data storage 328. In one implementation, the control circuitry 326 may overwrite the existing association information 330 for the first device 404 with the newer information 330 for the second device 606, thus combining the disassociation and association tasks.

Similarly, upon sending the reply 708B including the association information 330 to the remote control device 302, the second electronic device 606 considers itself associated 716 with the remote control 302. In one arrangement, the control circuitry 326, after associating the remote control 302 with the second device 606, may transmit information (not shown in FIG. 7) relating to the association by way of the transmitter 322. Further, the second device 606 may pair itself with the remote control 302 only after such a transmission from the remote control 302 in one implementation. In one example, such information may represent a simple acknowledgment of the reply 708B. In another implementation, the information may include configuration information relating to the association of the remote control 302 with the second device 606. For example, in the case of a television set-top box, the remote control 302 may indicate a particular television output of the second device 606 to be associated with the remote control 302 such that output-specific commands transmitted from the remote control 302 will affect the designated television output of the second electronic device 606.

At least some embodiments as described herein thus automatically disassociate a remote control device from a first electronic device being replaced by a second electronic device, and automatically pair the remote control with the second device, in response to the user merely attempting to use the remote control with the second device in the absence of the first device. Thus, the user need not perform a complex procedure involving the remote control or the newer device to control the newer device using the remote, and the services of a professional installer would not be required to associate the remote control with the newer device. Moreover, a new remote control need not be supplied with each second device being provided as a replacement for a similar, but older or malfunctioning, device to guarantee proper operation of the remote control with the newer device, resulting in significant cost savings for the user and/or the device supplier.

While several embodiments of the invention have been discussed herein, other implementations encompassed by the scope of the invention are possible. For example, while various embodiments have been described within the context of a television set-top box, other electronic devices capable of being controlled by way of a wireless remote control device, including, but not limited to, televisions, audio receivers, gaming consoles, DVRs, CD and DVD players, and computers, may benefit from application of the concepts explicated above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of changing an association of a remote control device from a first electronic device to a second electronic device, the method comprising:

at the remote control device associated with the first electronic device, generating and transmitting a command, wherein the command is configured to control the first device and includes information indicative of the association between the remote control and the first electronic device; and wherein the remote control device is not associated with the second electronic device;

at the remote control device, awaiting an acknowledgment of the command;

at the remote control device, transmitting a request to associate the remote control device with the second electronic device if the acknowledgment is not received;

at the remote control device, receiving a reply to the request to associate from the second electronic device, wherein the reply identifies the second device; and at the remote control device, disassociating the remote control device from the first electronic device, and associating the remote control device with the second electronic device, in response to the reply.

2. The method of claim 1, further comprising:
at the remote control device, receiving a user input to transmit the command.

3. The method of claim 1, wherein:
the command is generated and transmitted in response to an event occurring within the remote control device.

4. The method of claim 1, further comprising:
at the remote control device, retransmitting the command if the acknowledgment is not received.

5. The method of claim 4, wherein:
retransmitting the command if the acknowledgment is not received comprises retransmitting the command multiple times if the acknowledgment is not received.

6. The method of claim 2, wherein:
the request to associate the remote control device with another electronic device is appended to the retransmitted command.

7. The method of claim 1, wherein:
the request comprises a first address for the remote control device; and
the reply comprises a second address for the remote control device.

8. The method of claim 7, wherein:
the first address comprises a media access control address for the remote control device; and
the second address is shorter than the first address.

9. The method of claim 7, further comprising:
at the remote control device, storing the second address;
at the remote control device, transmitting a second command to the second electronic device, wherein the second command comprises the second address; and
at the remote control device, receiving an acknowledgment of the second command from the second electronic device.

10. The method of claim 1, further comprising:
at the remote control device, while the remote control device is associated with the first electronic device, receiving a prior user input prior to the first user input to transmit a prior command;
at the remote control device, generating and transmitting the prior command, wherein an acknowledgment of a most recent command transmitted prior to the prior command was not received;
at the remote control, transmitting the request to associate the remote control device with another electronic device in conjunction with the transmission of the prior command;
at the remote control device, receiving an acknowledgment of the prior command from the first electronic device;
at the remote control device, receiving a second prior user input after the prior user input to transmit a second prior command; and
at the remote control device, generating and transmitting the second prior command, wherein the request to associate the remote control device with another electronic device is not transmitted in conjunction with the second prior command.

11. The method of claim 1, wherein:
the command is transmitted as a first radio frequency signal; and
the reply is received as a second radio frequency signal.

12. The method of claim 1, further comprising:
at the remote control device, transmitting an acknowledgment of the reply to the second electronic device.

13. A computer-readable tangible storage medium having encoded thereon instructions executable by a processor of a remote control device to perform a method of changing an association of the remote control device from a first electronic device to a second electronic device, the method comprising:
at the remote control device associated with the first electronic device, generating and transmitting a command, wherein the command is configured to control the first device and includes information indicative of the association between the remote control and the first electronic device, and wherein the remote control device is not associated with the second electronic device;
awaiting an acknowledgment of the command;
transmitting a request to associate the remote control device with the second electronic device if the acknowledgment is not received;
receiving a reply to the request to associate from the second electronic device, wherein the reply identifies the second device;
and disassociating the remote control device from the first electronic device, and associating the remote control device with the second electronic device, in response to the reply.

14. A remote control device, comprising:
a user interface configured to receive user input;
control circuitry configured to generate commands in response to the user input;
a transmitter configured to transmit the commands; and
a receiver configured to receive replies to the commands;
wherein, when the remote control device is associated with a first electronic device to control the first electronic device, and when the remote control device is not associated with a second electronic device, the control circuitry is further configured to:
generate and transmit a first command using the transmitter, wherein the command is configured to control the first device and includes information indicative of the association between the remote control and the first device;
await an acknowledgment of the first command via the receiver;
if the acknowledgment is not received, transmit using the transmitter a request to associate the remote control device with the second electronic device;
receive via the receiver a reply to the request to associate from the second electronic device, wherein the reply identifies the second device; and
disassociate the remote control device from the first electronic device, and associate the remote control device with the second electronic device, in response to the reply.

15. The remote control device of claim 14, wherein:
the control circuitry is configured to receive a first user input by way of the user interface to transmit the first command by way of the transmitter.

16. The remote control device of claim 14, wherein:
the control circuitry is configured to retransmit the first command by way of the transmitter if the acknowledgment is not received.

17. The remote control device of claim 16, wherein:
the control circuitry is configured to append the request to the retransmitted command before retransmitting the command and transmitting the request by way of the transmitter.

18. The remote control device of claim 14, wherein:
the request comprises a first address for the remote control device; and
the reply comprises a second address for the remote control device.

19. The remote control device of claim 18, wherein:
the remote control device further comprises data storage; and
the control circuitry is configured to:
store the second address in the data storage to associate the remote control device with the second electronic device;
transmit a second command to the second electronic device by way of the transmitter, wherein the second command comprises the second address; and
receive an acknowledgment of the second command from the second electronic device by way of the receiver.

20. The remote control device of claim 19, wherein:
the control circuitry is configured to delete or overwrite a previous address for the remote control device from the data storage to disassociate the remote control device from the first electronic device.

* * * * *